March 11, 1969  F. C. MIKELS  3,431,991
DIGGING HEAD FOR WATER COLLECTOR PIPE
Filed Oct. 23, 1967  Sheet 1 of 2

INVENTOR.
FREDERICK C. MIKELS
BY
Lothrop & West
ATTORNEYS

INVENTOR.
FREDERICK C. MIKELS
BY
Lothrop & West
ATTORNEYS

United States Patent Office 3,431,991
Patented Mar. 11, 1969

3,431,991
DIGGING HEAD FOR WATER COLLECTOR PIPE
Frederick C. Mikels, P.O. Box 242,
Kennewick, Wash. 99336
Filed Oct. 23, 1967, Ser. No. 677,422
U.S. Cl. 175—400
Int. Cl. E21b 9/34, 11/02; E03b 3/11
5 Claims

ABSTRACT OF THE DISCLOSURE

An elongated, hollow, body is mounted on the leading end of a screen pipe emergent from the caisson of a water collector. The upper portion of the digger body is formed with a rounded nose and is imperforate whereas the bottom is substantially planar and is provided with openings. As the head is urged horizontally through a water-bearing stratum, detrital material is continuously flushed away from its situs, thus allowing the pipe to continue its advance. The fluid material passes through the body openings, thence through the screen pipe to the caisson for removal to waste. The shape and manner of operation of the digger head is such as to maintain a horizontal path.

---

The invention relates to improvements in earth digging heads mounted on the leading end of a water collector screen pipe.

The present invention is generally concerned with water collectors and methods of installing the same as set forth, for example, in Patent No. 2,622,683, granted Dec. 23, 1952, to Eugene W. Silitch et al. entitled "Apparatus and Method for the Collection of Water."

As shown and described in the foregoing patent, a vertical caisson is sunk into the ground until it intersects a water-bearing stratum, or aquifer. Then, perforated collector pipes, or screen pipes, are pushed radially outwardly, frequently in a star-shaped array, into the aquifer.

The radial, outward movement of the pipe is ordinarily effected by a hydraulic jack located within the hollow caisson, the jack forcing the pipe ahead into the earth.

Mounted on the leading end of the pipe is a digging head, or nose, having perforations therein to pass the fines and other detritus flushed by the water in the aquifer into the head from which point they are carried away to waste by suitable temporary ducting located within the screen pipe. As the detrital material is continuously removed, the digging nose can proceed to force its way ahead. After the screen pipe has been projected the proper distance, the temporary ducting is removed and thereafter the water from the aquifer flows by gravity through the screen pipe and into the caisson for withdrawal, as desired to the point of use.

It is of especial importance during installation of the device that the screen pipes remain in a horizontal attitude as they are advanced from the caisson outwardly into the aquifer.

Heretofore, the pipes have frequently deflected upwardly. One possible undesirable result of this upward movement is that the outer end portions of the pipe are no longer in the water bearing stratum, but instead are located in a superposed stratum which may either be impermeable or devoid of water. Another possible disadvantage is that where the outer end of the pipe deflects so far upwardly as to approach the ground surface, the inflowing water is subjected to surface contamination. In extreme cases, digging heads have broken through the ground surface.

Heretofore, the shape of the perforated digging heads, or noses used have been generally conical, or ogival, or in the shape of other surfaces of revolution. In short, they have been radially symmetrical about their longitudinal axis and have had uniformly distributed openings therein.

When these prior types of digging heads are initially forced outwardly from the caisson against the great resistance of the earth, the resistance is substantially equal over the entire surface of the head. However, as the water under pressure in the aquifer begins to flow through the perforations in the head, thence from the head through the temporary ducting to waste, this flowing water carries with it substantial quantities of fine-sized earth material.

As these fines are removed, the space previously occupied by the fines no longer offers the same resistance to advance, and the digging head can be forced onwardly by the hydraulic jack pushing against the screen pipe on which the head is mounted.

With the symmetrically shaped and perforated noses heretofore utilized, however, more fines were flushed away from above the head than from below the head. In other words, owing to gravity, more earth is flushed downwardly through the perforations on the upper half of the head than is flushed upwardly through the perforations on the lower half of the head.

This uneven removal of the fines leads to a condition of unbalanced resistance on the surface of the digging head. There is less resistance above the head than below. As a consequence, as the nose continues to advance under urgency of the jack, the nose begins to deflect above the horizontal.

Once upward deflection commences, there is a tendency for the deflection to continue at an accelerated rate. In other words, as the nose tilts above the horizontal, and continues to be pushed ahead against the resistance of the earth, the vertically upward component of the reaction force offered by the earth is greater on the lower half of the nose than on the upper half. So also, as the screen pipe begins to bend upwardly, the resistance acting on the lower half of the pipe further increases the upward trend.

The effects, therefore of this upward component, together with the reduced resistance against the upper half resulting from the greater removal of fines on the upper half, leads to upward deflection of the digging head, particularly when symmetrical nose members are used.

It is therefore an object of the invention to provide a digging head which substantially eliminates the upward deflection of screen pipes used in water collectors.

It is another object of the invention to provide a digging head which readily lends itself to attachment on the forward end of a screen pipe.

It is a further object of the invention to provide a digging head which affords an effective seating for the temporary ducting utilized during installation of the collector pipes.

It is still a further object of the invention to provide a digging head which is rugged and durable and is capable of effectively transmitting in a horizontal attitude the digging force imposed thereon.

It is another object of the invention to provide a generally improved digging head.

Other objects, together with the foregoing, are attained in the embodiment described in the following description and shown in the accompanying drawings in which.

Figure 5:
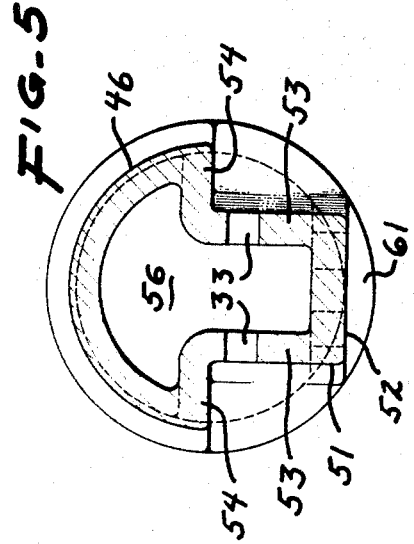
FIGURE 5 is a transverse sectional view, the plane of the section being indicated by the line 5—5 in FIGURE 3.

While the digging head of the invention is susceptible of numerous physical embodiments depending upon the environment and requirements of use, substantial numbers of the herein shown and described embodiment have been made, tested and used, and all have performed in an eminently satisfactory manner.

The digging head of the invention, generally designated by the reference numeral 12, is mounted on the outer end 13 of a perforated water collector pipe 14 or screen pipe, projecting horizontally and radially from the wall 16 of the vertical caisson 17 of a conventional water collector.

The screen pipe 14 preferably extends horizontally into a water bearing stratum 18, of earth, termed an aquifer. Under some conditions, the screen pipe projects into the aquifer a distance of several hundred feet.

Figure 1:
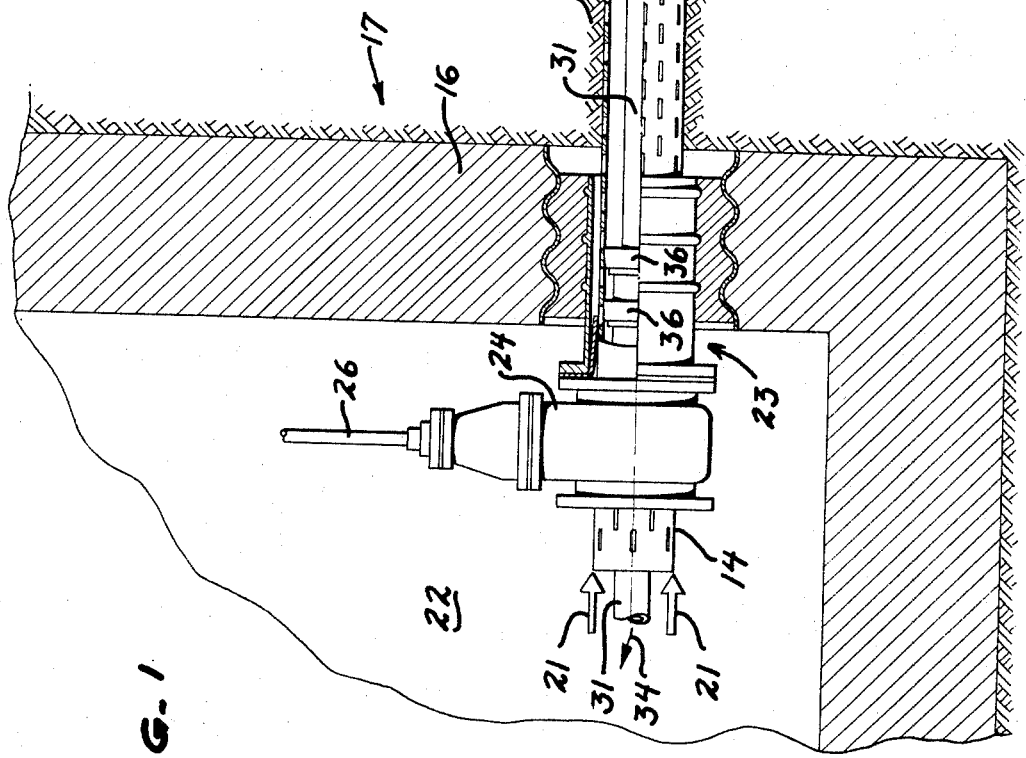
FIGURE 1 is a fragmentary section view, to a reduced scale, of a water collector caisson and a typical horizontally projecting screen pipe with a digging head mounted thereon, a water pipe also being illustrated as it would appear during digging.
Figure 2:
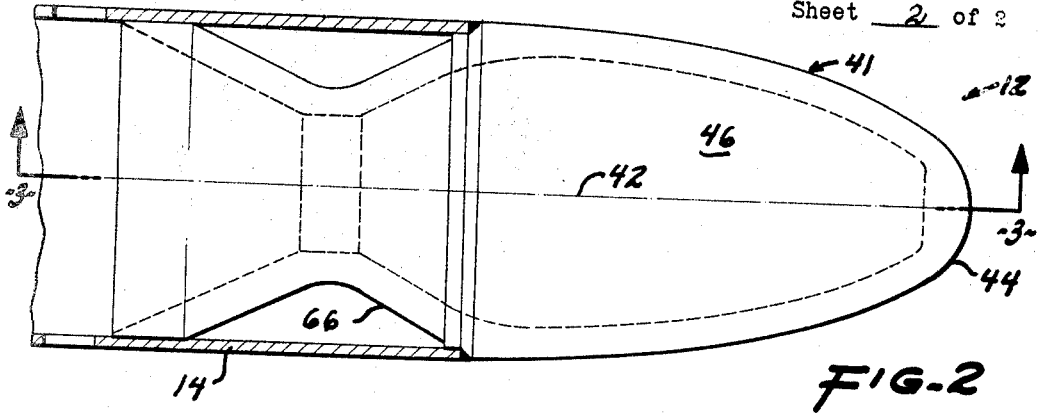
FIGURE 2 is a top plan view of a digging head shown mounted on the end of a screen pipe, shown in section.

By suitable apparatus, well known in the water collector art, the screen pipe 14 is urged radially outwardly, in the direction indicated by the arrows 21 in FIGURE 1. The force is customarily provided by a hydraulic jack (not shown) located within the caisson chamber 22. Appropriate sealing members, generally designated by the reference numeral 23, gate valve 24 and valve operating stem 26 leading to ground level are likewise well known in the art and are therefore not described in detail.

While digging (i.e. radial, outward projection of the screen pipe and digging head) proceeds, a temporary ducting member 31, or water pipe is utilized to withdraw water and fines from the digging head.

Flow of water and fine earth material from the vicinity of the digging head 12 passes through openings 33 in the head and, following the path of the arrows 34, is carried through the water pipe 31 to the surface and is there discharged to waste.

Concurrently, appropriate sealing members 36 and 37 annularly positioned between the screen pipe 14 and the water pipe 31 prevent the influx of water into the caisson.

Upon completion of the digging, the water pipe is removed.

As will be realized, the aquifer customarily consists of discrete particles of earth and rocks, such as gravel mixed with fines. The resistance encountered by the advancing digging head is therefore substantial. However, under the head of water existing in the aquifer, a flushing action takes place wherein most of the fines located in the vicinity of head are dislodged and carried away in the flow 34, as previously explained.

The withdrawal of the fines allows the digging head to be advanced.

So long as the resistance encountered by the digging head is substantially equal over the entire head, translation of the head and the attendant screen pipe proceeds in a horizontal plane.

However, with the symmetrical and uniformly perforated digging heads heretofore used, the resistance acting on the upper half of the head soon becomes less than that on the lower half. The reason for this is that owing to gravity, the head of water acting on the upper half of the digging head dislodges the fines above the head and, acting directly downwardly, very readily flushes the fines downwardly through the underlying perforations. However, the fines below the central horizontal plane of the digger head must be moved upwardly, against gravity, in order to enter the head and be removed.

The overall effect of this is that more fines are removed above the digging head than below, causing the head to deflect upwardly where the resistance to advance is less.

Furthermore, as explained above, the shape of the lower half of the conical and similar symmetrical heads heretofore used has been conducive to upward deflection and to increase the extent of the deflection once it is started.

I have therefore so shaped the digging head as to counteract these tendencies and thus maintain the head and the screen pipe in a substantially horizontal plane as digging proceeds.

The head 12 comprises an elongated hollow body 41 arranged in mirror symmetry about a vertical, median, longitudinal plane 42, but asymmetrical with respect to a central, horizontal plane 43.

The head originates at its forward end in a substantially vertical tip, or plate, portion 44 merging upwardly and rearwardly into an arcuate nose portion 46, or dome, this upper rounded portion being acted upon by the resistance of the earth material in a direction tending to urge the nose downwardly as the head advances.

Figure 4:
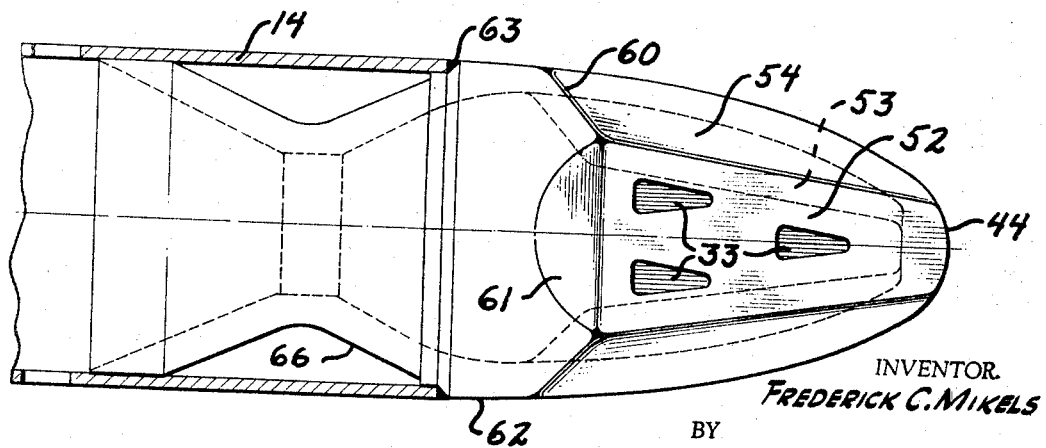
FIGURE 4 is a bottom plan view.

The lower portion of the head, on the other hand, is made up of a substantially U-shaped in section member 51 (see FIGURE 5) comprising a bottom plate 52 and a pair of upstanding side plates 53 culminating at their upper ends in a pair of laterally projecting flanges 54 joined to the dome 46. The bottom plate and the upstanding side plates are perforated by a plurality of openings 33, as shown. Preferably, the openings 33 are triangular in shape (see FIGURE 4) and diverge rearwardly so as to minimize any clogging resulting from dislodged particles of gravel, shale, and the like, passing inwardly to the interior chamber 56 of the head. The dislodged particles, in other words, do not tend to bridge the openings.

It is to be noted that the bottom plate 52 and the lateral flanges 54 are horizontal and therefore present no inclined surfaces against which the earth resistance can direct an upward component tending to deflect the advancing head upwardly. However, as previously stated, the arcuate dome portion 46 affords a surface tending toward a downward deflection of the head.

Furthermore, it will be seen that the dome portion 46 is devoid of openings, the openings being located, instead, on the side plates 53 and on the horizontal bottom, or shovel plate 52.

The combination of these two features is such as to counteract the persistent tendency of gravity to dislodge and remove many more of the fines above the head than below. As a consequence the head 12 tends to maintain a horizontal path as it advances forwardly.

Since the forward end of the screen pipe 14 is circular, the lower half of the head is provided with transition portions 60 and 61 merging into an approximately circular cylindrical band portion 62 formed at its after end with an annular shoulder 63 shaped for a smooth welded connection to the forward end of the screen pipe 14.

Affording even greater rigidity to the screen pipe and digging head connection is a Venturi-shaped apron 66 extending rearwardly from the generally cylindrical band portion 62 of the head.

The apron 66 includes a converging portion 67, a throat portion 68 and a flared skirt portion 69 terminating at its beveled, after periphery 71 in touching engagement with the screen pipe 14.

Figure 3:
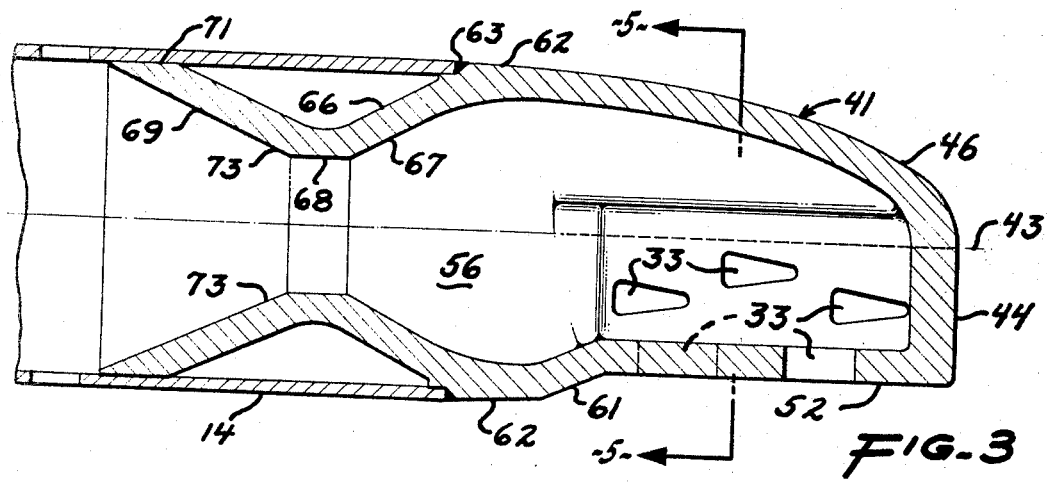
FIGURE 3 is a median, longitudinal sectional view, the plane of the section being indicated by the line 3—3 in FIGURE 2.

As appears most clearly in FIGURE 1, the flared skirt 69 provides a convenient, self-positioning, self-centering conical seat against which the forward end of the temporarily used water pipe 31 can abut, or seat, at approximately the location indicated by the numeral 73 in FIGURE 3, the throat opening 68 merging smoothly into the opening of the seated water pipe.

It can therefore be seen that I have provided a digging head for use in water collectors which not only possesses great strength and rigidity, and which affords a built in seat for the water pipe, but which also guides the screen pipe in a horizontal path and thereby overcomes the objectionable tendency of previously used digging heads to deflect upwardly.

What is claimed is:

1. A digging head for a water collector screen pipe, said digging head comprising an elongated hollow body extending between a forward end and an after end, said after end including a portion which is annular in transverse section for attachment to the pipe, said forward end including a portion which in transverse section includes a substantially U-shaped base surmounted by an arcuate dome, said base having at least one opening therein for the passage therethrough of water and detritus, and an intermediate transition portion connecting said forward end portion and said after end portion.

2. A digging head as in claim 1 wherein said after end portion is formed with an external annular shoulder to receive the forward end of the water collector screen pipe.

3. The device of claim 1 further including a rearwardly extending Venturi-shaped apron merging at its forward end with said annular portion of said body, the neck portion of said apron having a circular in section seat capable of seating the forward end of a water collector water pipe.

4. A device as in claim 1 wherein said body is defined at its forwardmost end by a transverse plate merging with said U-shaped base and with said arcuate dome.

5. A device as in claim 1 wherein said body is arranged in mirror symmetry with respect to a vertical, median, longitudinal plane, and is asymmetrical relative to a central, horizontal plane.

References Cited
UNITED STATES PATENTS

| | | | |
|---|---|---|---|
| 2,324,102 | 7/1943 | Miller et al. | 175—400 X |
| 2,383,496 | 8/1945 | Nebolsine | 175—62 |
| 2,670,180 | 2/1954 | Ranney | 166—158 X |
| 3,177,955 | 4/1965 | Allen et al. | 166—50 X |

DAVID H. BROWN, *Primary Examiner.*

U.S. Cl. X.R.

175—21; 166—50, 158